(12) United States Patent
Sanetick et al.

(10) Patent No.: US 8,128,076 B2
(45) Date of Patent: Mar. 6, 2012

(54) NOISE ATTENUATOR FOR SIDE WALL PANEL

(75) Inventors: Robert M. Sanetick, Orchard Park, NY (US); Jeffrey N. Weisbeck, East Aurora, NY (US)

(73) Assignee: ITT Manfacturing Enterprises, Inc., Wilmington, DE (US)

(*) Notice: Subject to any disclaimer, the term of this patent is extended or adjusted under 35 U.S.C. 154(b) by 378 days.

(21) Appl. No.: 12/266,643

(22) Filed: Nov. 7, 2008

(65) Prior Publication Data

US 2010/0116584 A1    May 13, 2010

(51) Int. Cl.
  *F16F 1/44*    (2006.01)
(52) U.S. Cl. .................. 267/293; 267/141.1; 248/635
(58) Field of Classification Search ....... 267/136–141.7, 267/293; 248/610, 634, 635
  See application file for complete search history.

(56) References Cited

U.S. PATENT DOCUMENTS

| | | |
|---|---|---|
| 4,465,312 A | 8/1984 | Werner |
| 4,630,809 A | 12/1986 | Duckworth |
| 4,717,094 A | 1/1988 | Chee |
| 4,723,791 A | 2/1988 | Miura et al. |
| 4,747,587 A | 5/1988 | Ferrel |
| 4,779,852 A | 10/1988 | Wassell |
| 4,934,667 A | 6/1990 | Pees et al. |
| 5,009,401 A | 4/1991 | Weitzenhof |
| 5,081,935 A | 1/1992 | Pavlick |
| 5,117,704 A | 6/1992 | Kish et al. |
| 5,307,508 A | 4/1994 | Rollins et al. |
| 5,308,048 A | 5/1994 | Weaver et al. |
| 5,312,093 A | 5/1994 | Smith et al. |
| 5,342,029 A | 8/1994 | Carter |
| 5,362,035 A | 11/1994 | Carter |
| 5,829,730 A * | 11/1998 | Ott ............................... 248/635 |
| 5,839,517 A | 11/1998 | Gwinn et al. |
| 5,899,288 A | 5/1999 | Schubert et al. |
| 5,904,010 A | 5/1999 | Javid et al. |
| 5,927,407 A | 7/1999 | Gwinn et al. |
| 5,996,981 A * | 12/1999 | Dilling ......................... 267/153 |
| 6,129,328 A | 10/2000 | Knurek et al. |
| 6,446,993 B1 | 9/2002 | Huszarik et al. |
| 6,482,119 B2 | 11/2002 | Bodtker et al. |
| 6,676,116 B2 | 1/2004 | Edberg et al. |

(Continued)

OTHER PUBLICATIONS

Weisbeck, Jeffrey N., Effect of stiffness, damping, and design on side panel isolator noise attenuator characteristics, Inter-Noise, Dec. 3, 2006, pp. 1-10, Honolulu, HI.

*Primary Examiner* — Christopher Schwartz
(74) *Attorney, Agent, or Firm* — Hiscock & Barclay, LLP

(57) ABSTRACT

A noise attenuator for attaching a side wall panel to a frame that is exposed to vibratory loads and which includes a rigid core having a sleeve with two radially disposed end plates. A bracket encircles a portion of said sleeve between the end plates and is in non-contiguous relationship with the core. An elastomeric bushing is bonded to a portion of the bracket and the core with the exception of the outer faces of the end plates, which remain exposed. Voids are passed through the rear plate and extend axially between the bracket and the sleeve some length into the sleeve. Due to the geometry of the unit, the non-voided sections of the bushing are loaded in either a combination of tension and shear or compression and shear when the core is connected to a vibrating frame and the bracket is connected to a side wall panel.

20 Claims, 6 Drawing Sheets

U.S. PATENT DOCUMENTS

| | | |
|---|---|---|
| 7,137,634 B2 | 11/2006 | Oh |
| 7,644,911 B2* | 1/2010 | Rodecker .................... 267/293 |
| 2002/0079627 A1 | 6/2002 | McCollough et al. |
| 2004/0113337 A1 | 6/2004 | Landry, Jr. |
| 2006/0244188 A1* | 11/2006 | Johnson et al. ............... 267/293 |
| 2009/0224448 A1* | 9/2009 | Rodecker .................. 267/141.1 |

* cited by examiner

NOISE ATTENUATOR FOR SIDE WALL PANEL

FIELD OF THE INVENTION

This invention relates generally to a side panel noise attenuator for reducing the transmission of noise producing vibrations from a supporting frame or frame member to a side wall panel that is mounted upon the supporting frame or frame member.

BACKGROUND OF THE INVENTION

Elastomeric attenuators have been used for some time for joining wall panels to supporting frames that are subject to vibratory loads in an effort to reduce the amount of noise producing vibrations that are transmitted to the panel. One such application involves the mounting of the interior wall panels of an aircraft to the superstructure of the aircraft. There is an increased demand for reduced cabin noise levels and reduced aircraft weight. Accordingly, there is now a need for more compliant attenuator units that can replace those presently in use, but without having to increase the size and weight of these units.

Cylindrical elastomeric shock isolators have also been used for some time in the automobile industry to reduce the effect of road-induced load upon a vehicle's suspension system. Typically, these devices involve an inner tubular sleeve and an outer tubular sleeve with the sleeves being superimposed one over the other along a common longitudinal axis. An elastomeric bushing is mounted in the space between the two sleeves and the bushing in most cases is bonded to one or both sleeves. As explained in greater detail in U.S. Pat. No. 6,446,993, this type of bushing is generally mounted between the suspension system of the vehicle and its frame with the outer sleeve press fitted in the suspension system and the inner sleeve being secured to the frame by some type of fastener. A pair of opposed voids are sometimes placed longitudinally in the bushing to soften the spring rate of the bushing along the reaction axis of the system along which road induced forces are transmitted back into the suspension system. Forces that are transmitted into the bushing due to steering inputs act perpendicular to the reaction axis and are attenuated in the unvoided areas of the bushing, which have an increased spring rate thus providing the driver with a better feel of the road.

Although the above-described voided elastomeric isolators, as used in the automotive industry perform quite well to reduce the effect of road induced forces, these devices do not perform as well when dealing with vibratory induced noise and, in particular, noise in the mid and high range frequencies.

SUMMARY OF THE INVENTION

It is therefore an object of the present invention to improve noise attenuators and, in particular, to improve attenuator units dealing with noise produced by a vibratory load.

A further object of the present invention is to provide a voided elastomeric noise attenuator that more effectively reduces the transmission of noise produced by vibratory loads, particularly at the mid and high range frequencies.

A still further object of the present invention is to provide a voided elastomeric noise attenuator for reducing the amount of noise transmitted from a support frame that is subjected to vibratory load into a side wall panel that is mounted upon the frame.

Another object of the present invention is to reduce the amount of noise transmitted to an interior side wall panel of an aircraft mounted upon the airframe of an aircraft.

These and other objects of the present invention are attained according to one version by a noise attenuator for attaching a wall panel to a supporting frame that is subjected to noise producing vibrations. The attenuator contains a rigid core element having an elongated tubular sleeve and front and rear end plates radially extended from each end of the sleeve. A bracket encircles a portion of the sleeve between the end plates and is in non-contiguous relationship with the core element. An elastomeric bushing is bonded to both the core element and a portion of the bracket such that the bushing fills the space between the end plates. A series of voids are passed longitudinally through one of the end plates and extend into the bushing between the bracket and the sleeve. The core element is affixed to the frame and the bracket to the side panel.

According to another version, a noise attenuator is provided that comprises a rigid core that further includes a tubular sleeve containing a front face plate that is secured to one end of the sleeve and a rear face plate that is secured to the opposite side of the sleeve. The front and rear face plates extend radially beyond the sleeve to establish a space therebetween. An elastomeric bushing surrounds the sleeve and fills the space between the end places. A series of circumferentially spaced voids pass through one end of the end plates and extend substantially through the bushing, the attenuator further including mounting means for connecting the core to a first member and the bushing to a second member such that noise producing vibrations in one member are attenuated before said vibrations reach the second member.

According to one variation, four voids are equally spaced about the sleeve with a first pair of opposed voids being axially aligned along a first load axis of the attenuator and a second pair of opposed voids axially aligned along a second load axis normal to the first load axis.

According to yet another version, there is provided a method for manufacturing a noise attenuator, the method comprising the steps of providing a rigid core that includes an elongated tubular sleeve having respective plates at opposite ends of the sleeve, each plate having an end face that is normal to the longitudinal axis of the sleeve. An elastomeric bushing is provided that is bonded to the rigid core and to a bracket that encircles the sleeve in which the bushing fills the space between the end plates. A series of voids are created that longitudinally pass through at least one of the plates and axially substantially through the bushing. One of the plates is secured against one of a first member or a second member subjected to vibratory loads and the bracket is secured to the other of the first or second member.

These and other objects as well as features and advantage aspects will be discussed in the following Detailed Description, which should be read in conjunction with the accompanying drawings.

DETAILED DESCRIPTION

The following relates to an exemplary embodiment for a noise attenuator for reducing the transmission of noise producing vibrations from a support frame to a side wall panel mounted upon the frame. Certain terms are used throughout in order to provide a sufficient frame of reference with regard to the accompanying drawings. These terms, however, are not intended to be limiting of the present invention, as claimed herein, except where so specifically indicated.

Referring initially to FIGS. 2-6, there is illustrated a noise isolation assembly or attenuator unit, generally referenced 10, that is configured to attenuate vibratory induced noises over a wide frequency range of between 100 Hz and 10,000 Hz. In this exemplary embodiment a single attenuator unit 10 is illustrated, the unit being mounted in a single bracket referenced 12. It should be understood, however, that one or more attenuator units may be mounted within a single bracket without departing from the teachings of the present invention and therefore the present embodiment is intended to be exemplary.

Figure 1:
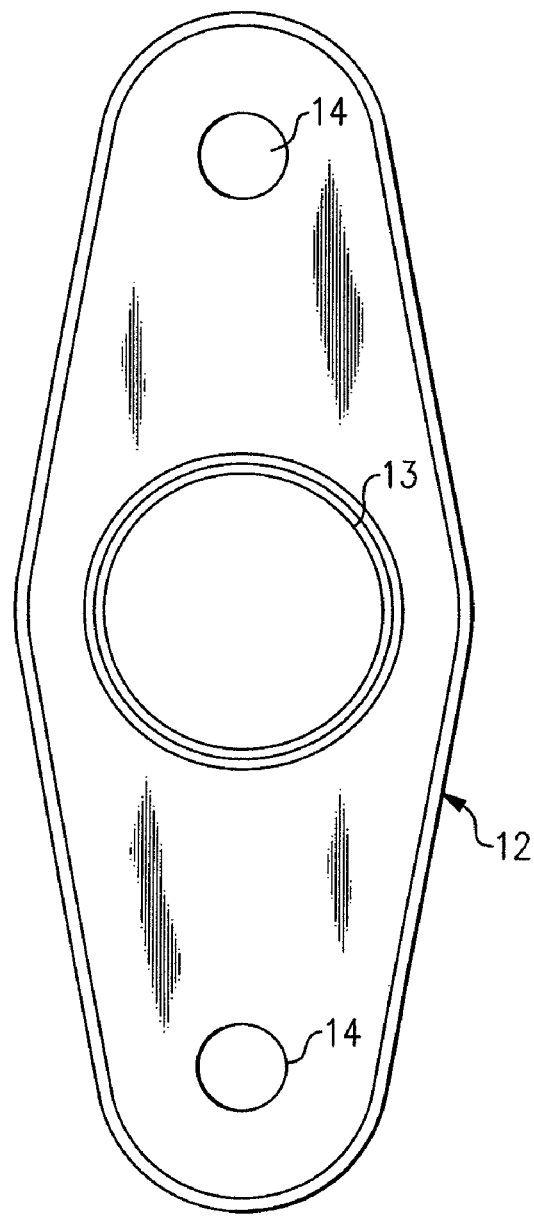
FIG. 1 is a front view of a bracket for supporting an attenuator unit that embodies one version of the present invention.
Figure 2:
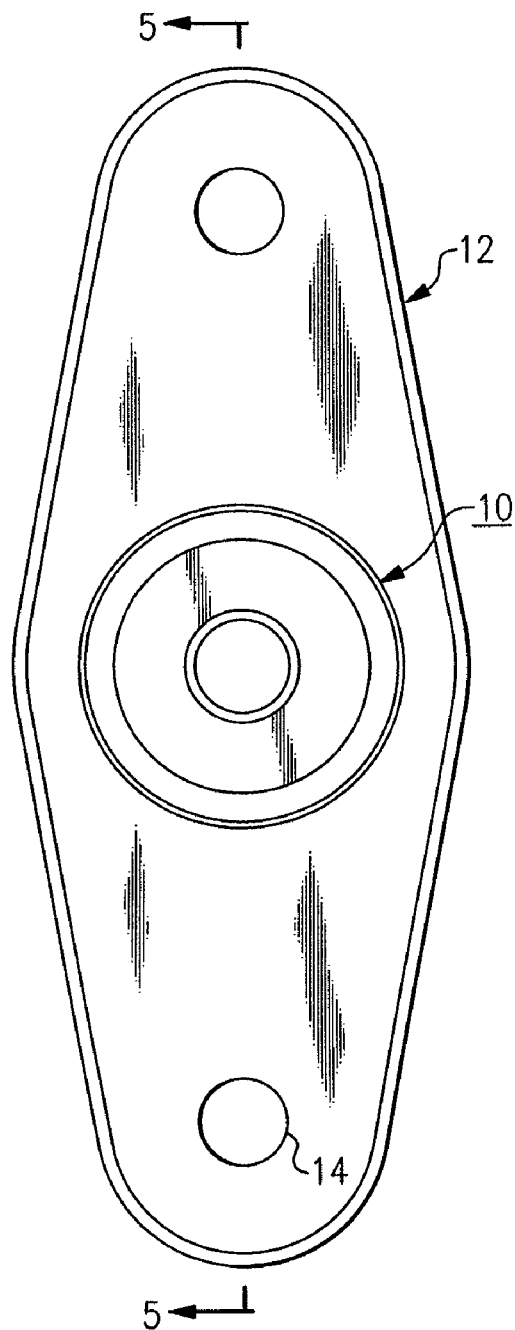
FIG. 2 is a front view of the bracket shown in FIG. 1 having a noise attenuator that according to one embodiment is mounted therein.
Figure 3:
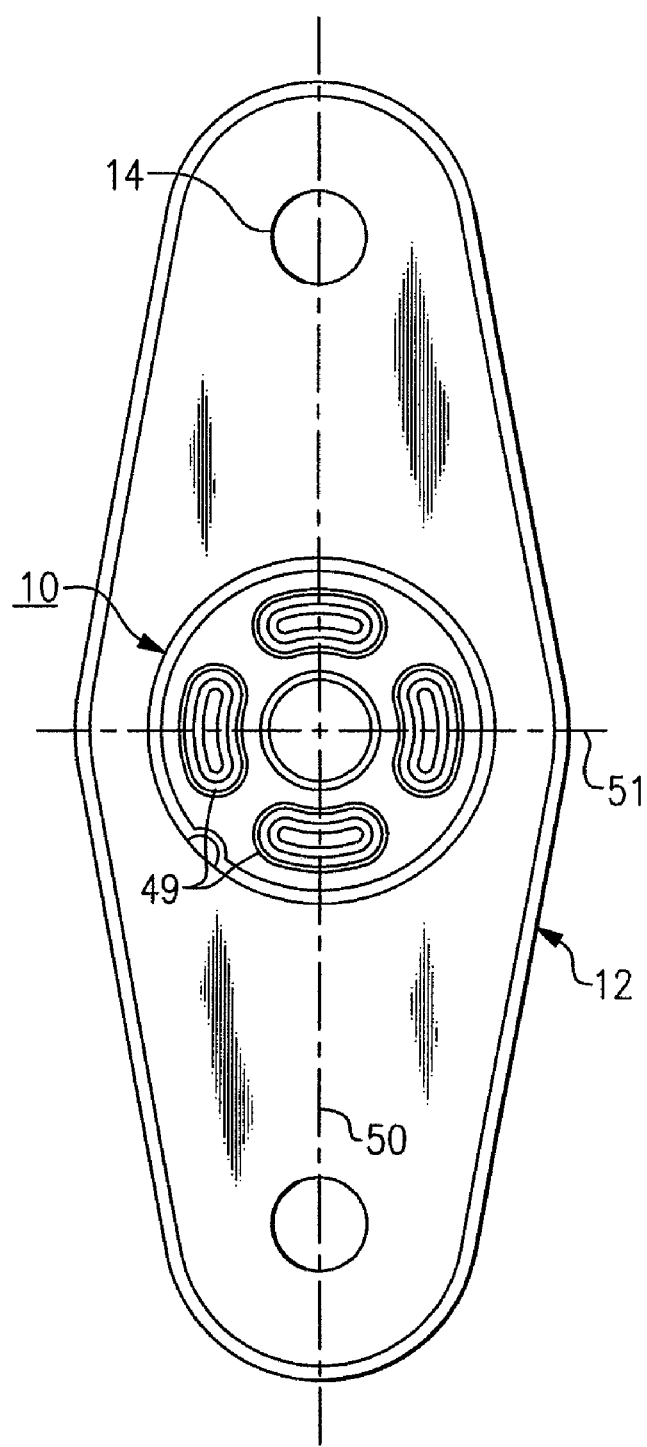
FIG. 3 is a rear view of the bracket assembly shown in FIG. 2.
Figure 4:
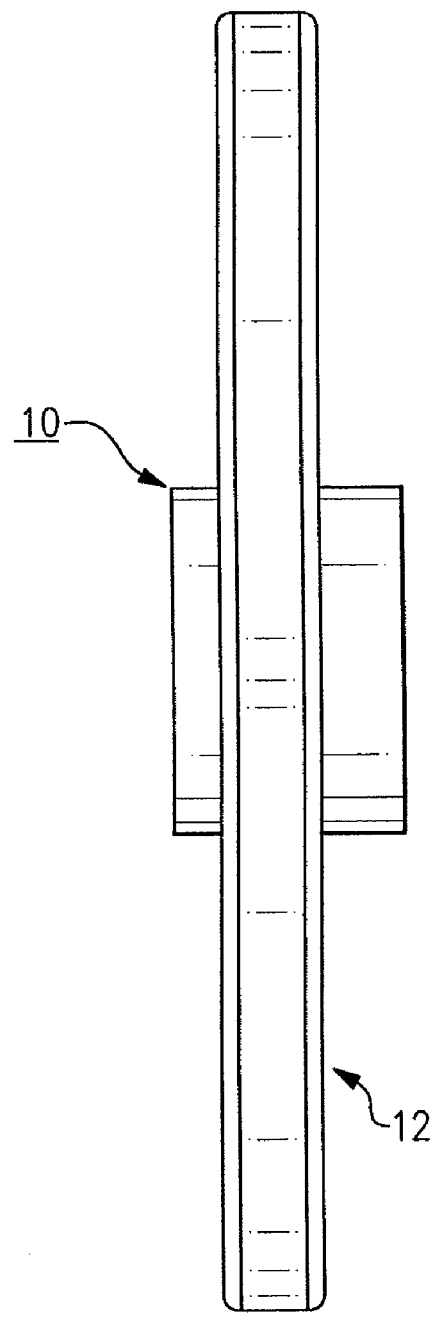
FIG. 4 is a side elevation of the bracket assembly shown in FIG. 2.

FIG. 1 illustrates the geometry of the bracket 12 with the attenuator unit removed. The bracket 12 is fabricated of a rigid material, such as metal or a high strength plastic, that can withstand high loads without deforming or breaking. The bracket 12 includes a central hole 13 sized for accepting the attenuator unit 10. Also included in the bracket 12 are two mounting holes 14 at opposing ends thereof for mounting the bracket against a flat surface (not shown).

Figure 5:
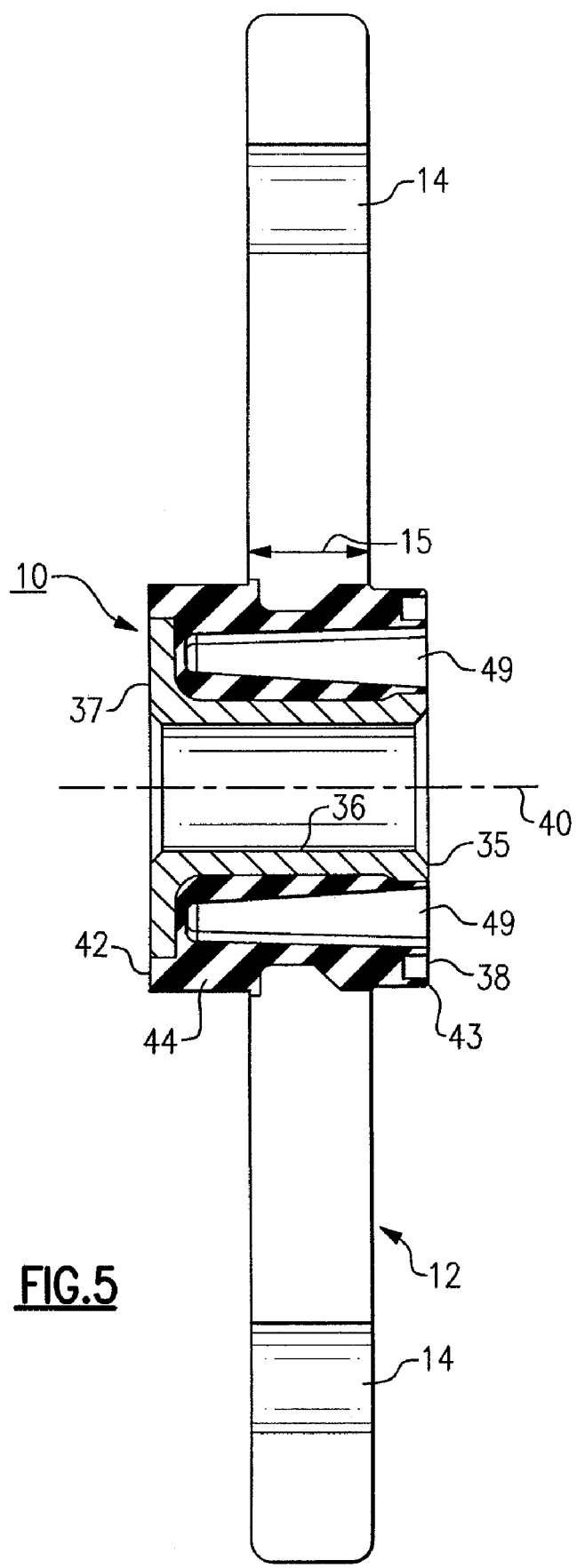
FIG. 5 is a sectional view taken along lines 5-5 in FIG. 2 further illustrating a noise attenuator according to the present invention.

Turning more specifically to FIG. 5, an attenuator unit 10 is shown in greater detail. The attenuator unit 10 contains a central core element, generally referenced 35, which preferably is fabricated from metal or other rigid material. The core element 35, in turn, includes a tubular sleeve 36 and a pair of opposed radially extended end plates 37 and 38 located at either end of the sleeve. The end plates 37, 38 according to this embodiment are circular in form and are coaxially aligned with the longitudinal axis 40 of the sleeve 36. Other forms are possible provided they cover the sleeve ends. The front end plate 37 has a diameter that is slightly less than the diameter of the center bracket hole 13 and thus allows the front end plate of the core element 35 to pass through the hole in the bracket 12.

The attenuator unit 10 may be fabricated in a molding fixture (not shown) that allows the core element 35 of each unit to be passed through the center hole 13 in the bracket 12 wherein the bracket is positioned between the two end plates 37, 38 of the core element 35. The thickness of the bracket wall 15 is less than the longitudinal inside distance between the end plates 37, 38 and thus encircles only a portion of the sleeve 36. As shown in FIG. 5, the bracket 12 is located within the fixture so that the receiving hole 13 in the bracket is coaxially aligned with the longitudinal axis 40 of the core element 35. The mold cavity is then closed and an elastomeric bushing 44 is molded so that it encapsulates the core element 35 and the section of the bracket 12 that surrounds the hole 13. As molded, according to this specific embodiment, the elastomeric bushing 44 is cylindrical in form with the center of the bushing being coaxially aligned with that of the core element 35. In addition, the opposed outer faces of the bushing 44 are in coplanar alignment with the outer faces 42 and 43 of the two end plates 37, 38 so that the faces of the end plates are exposed when the bracket 12 is removed from the mold.

A series of circumferentially spaced voids 49-49 are formed in the attenuator unit 10. In this particular embodiment, four voids at 90° intervals are placed around the sleeve 36. Each void passes through the rear end plate 38 of the core element 35 and extends axially substantially through the entire width of the elastomeric bushing 44 passing between the bracket 12 and the sleeve 36. The voids 49 in this embodiment are generally arcuate shaped with two of the voids being centered upon the vertical loading axis 50, FIG. 3, of the unit 10 and two other voids being centered upon the horizontal loading axis 51, FIG. 3, of the unit. Although four voids 49 are employed in the present embodiment, more or less voids might be utilized without departing from the teachings of the invention. The voids included in the rear end plate 38 facilitate molding. Accordingly, the stiffness in the voided areas in the elastomeric bushing 44 is considerably reduced thus reducing the amount of noise that is transmitted through the bushing when the unit 10 is experiencing vibratory loads. It should be further noted the bushing 44 in the non-voided regions is constrained between the two end plates 37, 38 of the core element 35. Exerting a vibratory load upon the attenuator unit 10 along the load axis thus causes the non-voided regions of the bushing 44 to be placed under either a combined compression and shear stress or a combined tension and shear stress depending upon the direction of the vibration input. Tests have proven that by establishing this type of compound stress in the bushing 44, a further increase in attenuation can be realized.

Figure 6:
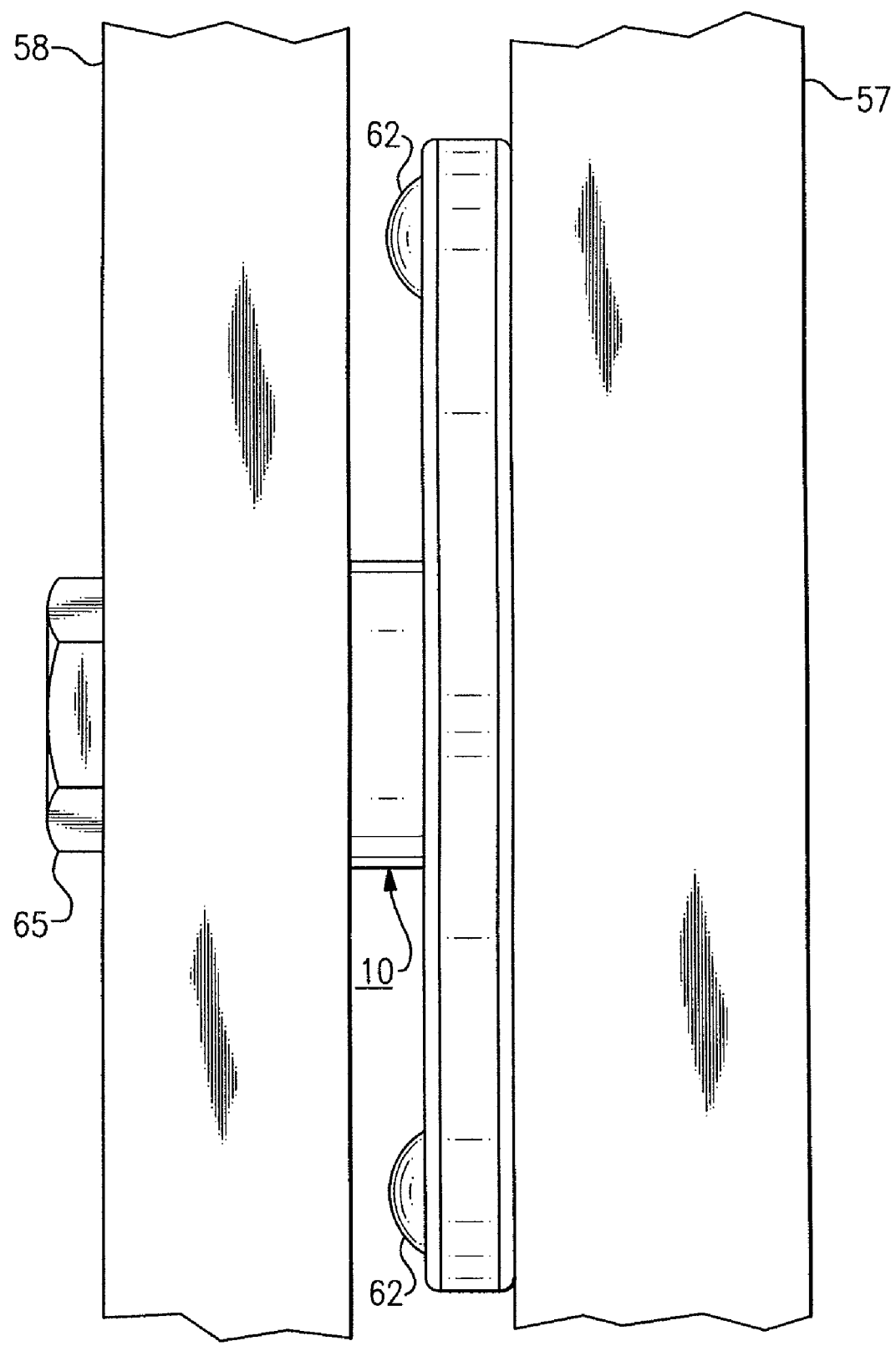
FIG. 6 is a side view of a bracket assembly similar to that shown in FIG. 2 illustrating a noise attenuator unit being employed to support a side panel upon a frame that is subject to noise producing vibrations.

FIG. 6 illustrates the noise isolation assembly 10 supporting a side wall panel 57, shown partially, of an aircraft upon the frame 58, which is also partially shown and part of the aircraft's superstructure. As noted above, the bracket 12 contains a noise attenuator unit 10 that embodies the teachings of the present invention which acts in concert to reduce the amount of noise that is transferred from the frame 58 to the side wall panel 57. The bracket base is seated tightly against the panel 57 and is secured in place using a pair of threaded fasteners 62 that pass into engagement with the panel 57. Although threaded fasteners are employed in this embodiment, it should be understood that any other suitable fastener that is capable of securing the bracket to the panel under the expected load condition may also be used without departing from the teachings of the invention. The exposed face of the front end plate 37 of the attenuator core 35 is seated securely against the frame 58 of the aircraft and the attenuator unit 10 is secured to the aircraft frame using a threaded fastener 65. The joint that is established between the attenuator unit 10 and the frame 58 is tight enough so that the attenuator unit moves in unison with the frame as the frame is caused to vibrate.

A test stand was constructed to investigate the noise isolation characteristics of the present attenuator unit 10. The test stand was designed to employ the well known four-pole method of measurement, which provides more accurate data concerning noise attenuation when compared to the more classic mass-spring-damper test method, particularly when dealing with vibratory loads in the mid and high frequency ranges.

Figure 7:
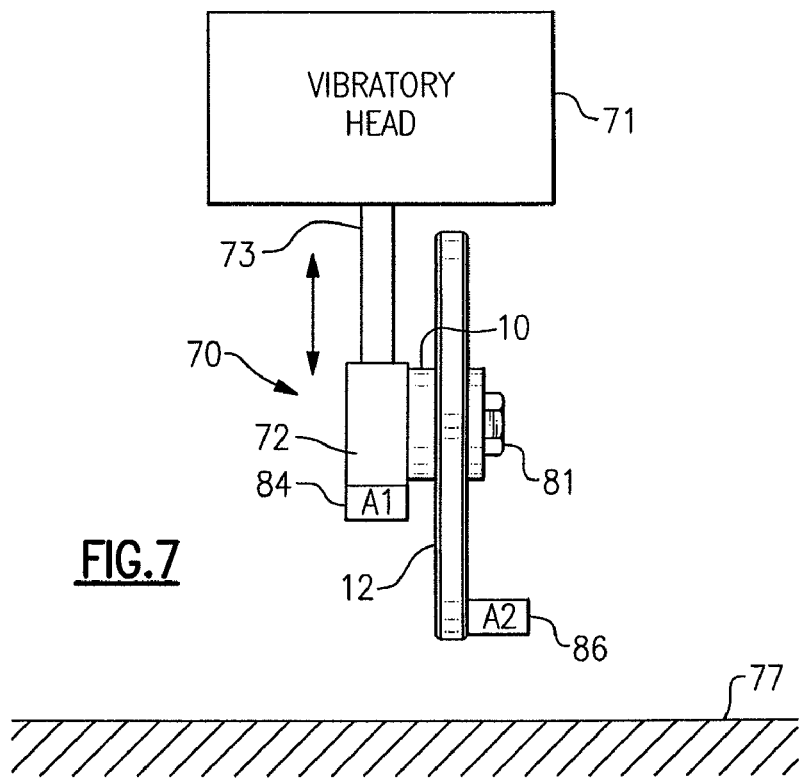
FIG. 7 is a side view illustrating a bracket assembly similar to that shown in FIG. 2 mounted in a four-pole test stand in a free configuration.
Figure 8:
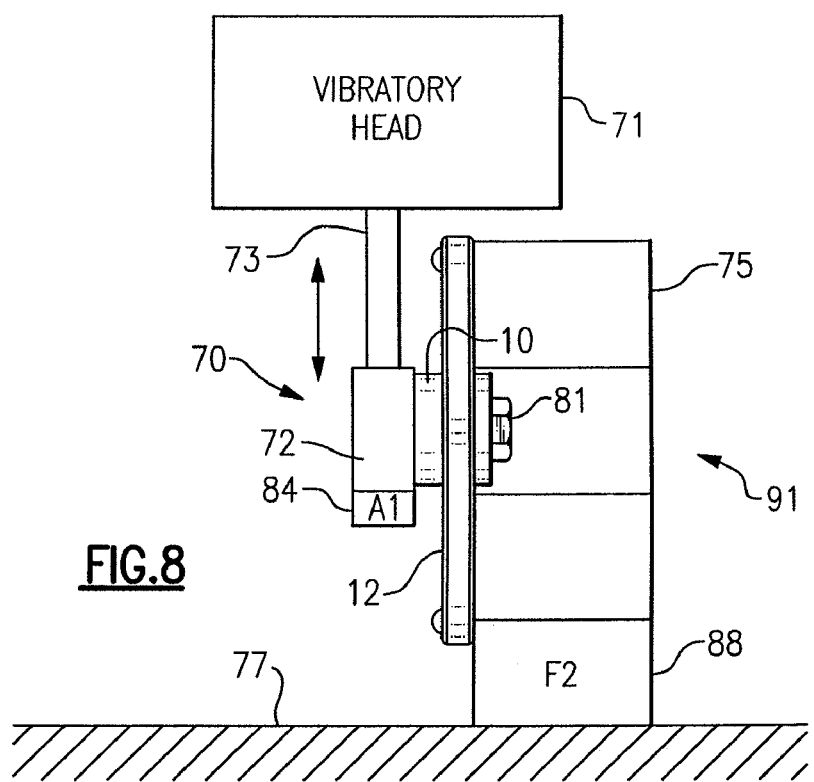
FIG. 8 is a view similar to FIG. 7, illustrating the bracket assembly mounted in the test stand in a blocked configuration.

The test stand, generally referenced 70, is illustrated in FIGS. 7 and 8. The test stand includes an electro-dynamic shaker or vibratory head 71 that is connected to a mounting head 72 by an arm 73. The shaker 71 imparts a sinusoidal input to the mounting head 72 at desired frequencies in a range of frequencies between about 100 Hz and 10,000 Hz. A mounting block 75 is situated adjacent the mounting head 72 and is stationarily supported upon a substrate 77, as shown in FIG. 8.

Bracket 12 illustrated in FIGS. 1-6 is shown secured to the mounting block 75. An attenuator unit 10 molded in the bracket 12 is secured to the mounting head 72 by a bolt 81.

The test fixture 70 illustrated in FIG. 7 is configured to conduct what is generally referred to as a free measurement test. For this test, an accelerometer 84 is secured to the mounting head 72 and a second accelerometer 86 is secured to one side of the bracket 12. Accordingly, the input acceleration $A_1$ and the output acceleration $A_2$ can be recorded when the bracket 12 is free or in an unrestrained posture apart from the mounting block 75.

FIG. 8 illustrates the test stand 70 configured in a blocked condition wherein the bracket 12 is held immobile upon the mounting block 75. In the blocked position and as shown in this figure, the mounting block 75 is fixed to a load sensor unit 88 that is secured in place to the substrate 77. The load sensor unit 88 provides a readout of the total force $F_2$ at the output side of the system at 91.

The aircraft side wall panel mounting arrangement illustrated in FIG. 6 establishes a linear mechanical system. As such the four-pole test method that uses frequency dependant quantities of acceleration and force can be used to find the transfer matrix T of an attenuator system, such as that illustrated in FIG. 6. The vibratory frame input creates both an acceleration $A_1$ and a force $F_1$ upon the core rigid element. The input acceleration and the input force are transformed by the attenuator system to an output acceleration $A_2$ and an output force $F_2$ due to the transfer matrix T of the attenuator system. As will be explained below, the four-pole test stand allows one to find the attenuation $A_1/A_2$ of the system by testing the attenuator bracket in both a blocked and unblocked condition and thus enables a determination to be made as to the effectiveness of the attenuator system.

For a linear mechanical attenuator system, such as that illustrated in FIG. 6 that is subjected to vibratory input load:

$$\begin{pmatrix} F_1 \\ A_1 \end{pmatrix} = \begin{bmatrix} T_{11} & T_{12} \\ T_{21} & T_{22} \end{bmatrix} \begin{pmatrix} F_2 \\ A_2 \end{pmatrix} \quad (1)$$

where the transfer matrix is broken into four acceleration and force components. The vibrational responses for the input acceleration and input force can be expressed as follows:

$$F_1 = F_2 T_{11} + A_2 T_{12} \quad (2)$$

$$A_1 = F_2 T_{21} + A_2 T_{22} \quad (3)$$

The vibrational responses of the four-pole arrangement described in equation (1) can be solved by the following equations:

$$T_{11} = \frac{F_1}{F_2}\bigg|_{A_2=0} \quad (4)$$

$$T_{12} = \frac{F_1}{A_2}\bigg|_{F_2=0} \quad (5)$$

$$T_{21} = \frac{A_1}{F_2}\bigg|_{A_2=0} \quad (6)$$

$$T_{22} = \frac{A_1}{A_2}\bigg|_{F_2=0} \quad (7)$$

As noted above, the subscript $A_2=0$ indicates output terminal pairs are measured in the blocked condition and the subscript $F_2=0$ indicates they are measured in the unblocked or free state. It can be further assumed that the force and acceleration transmissibilities are equal such that $T_{22}=T_{12}$.

Attenuation can now be solved as follows:

$$\frac{A_1}{A_2} = \frac{1}{\left[T_{22} + \left(\frac{T_{21}}{C_2}\right)\right]} \quad (8)$$

where $C_2$ is the below mount drive point accelerance.

The below mount drive point accelerance is typically measured independently on the side panel of interest.

Figure 9:
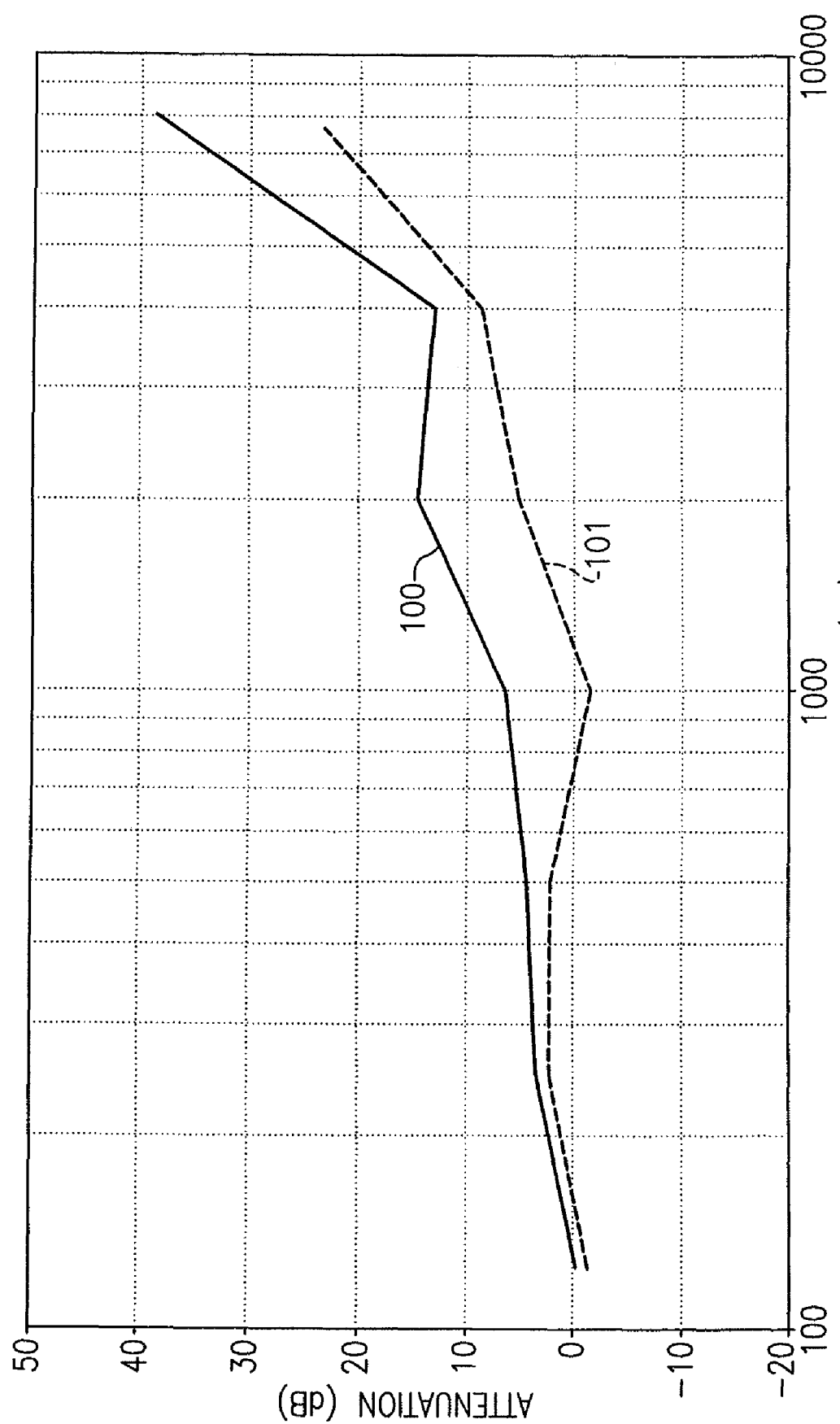
FIG. 9 is a graphic representation showing noise attenuation plotted against input frequency in which the response of the present unit is compared to that of a prior art unit.

As noted above, classical mass-spring-damper models do not accurately predict noise attenuation of isolators in the mid and higher range frequencies. The four-pole method, however, provides a means to better measure an isolators response over a wide range of frequencies. Tests have shown a 15 dB improvement or more in noise attenuation is realized when compared to most noise attenuators that are presently in use having the same size envelope without adversely affecting the attenuators load carrying capability. The increase in attenuation of the present device over the prior art devices is shown graphically in FIG. 9 wherein the solid line curve 100 represents the attenuation of the present invention and the dotted line curve 101 represents a typical prior art unit.

| Parts List for FIGS. 1-9 | |
| --- | --- |
| 10 | noise isolation assembly or attenuator unit |
| 12 | bracket |
| 13 | central hole |
| 14 | mounting holes |
| 15 | bracket wall |
| 35 | core element |
| 36 | sleeve, tubular |
| 37 | front end plate |
| 38 | rear end plate |
| 40 | longitudinal axis, sleeve |
| 42 | outer face |
| 43 | outer face |
| 44 | elastomeric bushing |
| 49-49 | voids |
| 50 | axis |
| 51 | axis |
| 57 | side wall panel |
| 58 | frame |
| 62 | threaded fasteners |
| 65 | threaded fastener |
| 70 | test stand |
| 71 | vibratory head or electro-dynamic shaker |
| 72 | mounting head |
| 73 | arm |
| 75 | mounting block |

| Parts List for FIGS. 1-9 | |
|---|---|
| 77 | substrate |
| 81 | bolt |
| 84 | accelerometer |
| 86 | accelerometer |
| 88 | load sensor unit |
| 91 | output side, system |
| 100 | curve |
| 101 | curve |

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A noise attenuator for attaching a load bearing wall panel to a frame that is subjected to vibratory loads, wherein said attenuator includes:
   a rigid core comprising an elongated tubular sleeve having a front plate located at one end of said sleeve and a rear plate located at the other end of said sleeve, said plates each having an end face that is normal to the longitudinal axis of said sleeve;
   a bracket having an opening that encircles a portion of said sleeve between said front and rear plates;
   a single elastomeric bushing that is bonded to said core and to said bracket so that the single bushing fills the space between said front and rear plates;
   a plurality of voids that pass longitudinally through said at least one of said front and rear plates and which extends axially substantially through said single bushing between said bracket and said sleeve;
   fastening means for securing one of the rear and front plates of said core tightly against said one of said frames and said load bearing wall panel; and
   mounting means for attaching said bracket to the other of said load bearing wall panel and said frame such that said bracket is radially loaded from the weight of the load bearing wall panel, said voids being oriented such that the non-voided regions of said bushing are placed under a combined tension and shear or a combined compression and shear in order to provide attenuation.

2. The attenuator of claim 1 wherein said core is fabricated of metal.

3. The attenuator of claim 1 wherein said bracket includes a vertical wall that contains said opening and mounting holes that are attached to one of said panel and frame.

4. The attenuator of claim 1 that includes four voids that are circumstantially spaced 90° apart.

5. The attenuator of claim 4 wherein said voids are generally arcuate shaped.

6. The attenuator of claim 1 wherein said bushing surrounds the outer rim of each end plate.

7. The attenuator of claim 6 wherein said bushing that has two opposed outer faces lie in the same plane as the outer faces of said front and rear plates.

8. The attenuator of claim 7 wherein the outer face of said front or rear end plate of said core is held by said fastening means in tight contact with said frame so that said core moves with said frame when said frame is subjected to a vibration load.

9. The attenuator unit of claim 1 wherein said opening in said bracket is slightly larger than the outer diameter of one of said front and rear plates whereby said bracket can pass over said one plate.

10. A noise attenuator comprising:
    a rigid core that further includes a tubular sleeve that contains a front face plate that is secured to one end of said sleeve and a rear face plate that is secured to the opposite end of said sleeve;
    said front and rear face plates extending radially beyond said tubular sleeve to establish a space therebetween;
    a single elastomeric bushing that surrounds said tubular sleeve and fills the space between said front and rear end plates, said single bushing being bonded to said sleeve and said plates;
    a plurality of circumferentially spaced voids that pass through one of said end plates and extend axially substantially through said single bushing; and
    mounting means for connecting said core to a first member and said bushing to a second member such that noise producing vibrations in one member are attenuated before said vibrations reach said second member, said voids being disposed such that vibratory loads upon said attenuator cause non-voided regions of said bushing to be placed in either a combined compression and shear or a combined tension and shear based on the direction of the vibratory load.

11. The noise attenuator of claim 10 wherein four voids are equally spaced about said sleeve with a first pair of opposed voids being axially aligned along a first load axis of the attenuator and a second pair of opposed voids axially aligned along a second load axis normal to said first load axis.

12. The noise attenuator of claim 10 wherein said plates are circular and are axially aligned with said sleeve.

13. The noise attenuator of claim 12 wherein each plate contains an outer rim to which said bushing is bonded.

14. The noise attenuator of claim 10 wherein said mounting means further includes a bracket that encircles a portion of said sleeve and wherein said bracket is bonded to said bushing.

15. The noise attenuator of claim 14 wherein said bracket is connected to said first member and said other of said end plates is connected to said second member.

16. The noise attenuator of claim 15 wherein said first member is a load bearing panel and said second member is a frame that is subjected to noise producing vibrations, said mounting means being configured such that when said attenuator is mounted, said bracket is radially loaded by said load bearing panel.

17. A method for manufacturing a noise attenuator, said method comprising the steps of:
    providing a rigid core that includes an elongated tubular sleeve having respective plates at opposite ends of said sleeve, each of said plates having an end face that is normal to the longitudinal axis of said sleeve;
    providing a single cylindrical elastomeric bushing;
    bonding said single elastomeric bushing to said core and to a bracket that encircles said sleeve, said bushing filling the space between said plates;
    creating a series of voids that longitudinally pass through at least one of said plates and axially substantially through said bushing;
    securing one of said plates against one of a first member and a second member subjected to vibratory loads; and securing the bracket to the other of said first member and said second member wherein said bracket is radially loaded when secured, said voids being configured such that the non-voided regions of said bushing are placed in either combined compression and shear or combined tension and shear, thereby creating attenuation.

18. The method of claim 17, wherein said void creating step includes the step of providing four voids in equally spaced relation about said tubular sleeve with a first pair of opposed voids being axially aligned along a first load axis of the attenuator and a second pair of opposed voids being axially aligned along a second load axis normal to the first load axis.

19. The method of claim 17, wherein said first member is a frame subjected to noise producing vibration and the second member is a load bearing wall panel.

20. The method of claim 19, wherein said frame and wall panel are part of an aircraft.

* * * * *